(12) United States Patent
Reynolds et al.

(10) Patent No.: US 7,757,265 B2
(45) Date of Patent: Jul. 13, 2010

(54) SYSTEM AND METHOD FOR LOCAL META DATA INSERTION

(75) Inventors: Steve Reynolds, Littleton, CO (US);
Tom Lemmons, Evergreen, CO (US);
Ian Zenoni, Highlands Ranch, CO (US);
Joel Hassell, Arvada, CO (US); Tom Huber, Parker, CO (US)

(73) Assignee: Intellocity USA Inc., San Francisco, CA (US)

( * ) Notice: Subject to any disclaimer, the term of this patent is extended or adjusted under 35 U.S.C. 154(b) by 897 days.

(21) Appl. No.: 09/818,052

(22) Filed: Mar. 27, 2001

(65) Prior Publication Data

US 2001/0037500 A1 Nov. 1, 2001

Related U.S. Application Data

(60) Provisional application No. 60/193,470, filed on Mar. 31, 2000.

(51) Int. Cl.
*H04N 7/16* (2006.01)
*H04N 7/10* (2006.01)
*H04N 7/025* (2006.01)

(52) U.S. Cl. .......................... 725/144; 725/36; 725/35

(58) Field of Classification Search ................. 725/119, 725/114, 116, 144, 146, 34–36, 136, 137, 725/112, 66, 67, 138, 32; 348/722; 715/723, 715/731
See application file for complete search history.

(56) References Cited

U.S. PATENT DOCUMENTS 4,572,509 A 2/1986 Sitrick
4,592,546 A 6/1986 Fascenda et al.
4,734,764 A 3/1988 Pocock et al.

(Continued)

FOREIGN PATENT DOCUMENTS

AU 717399 7/2000

(Continued)

OTHER PUBLICATIONS

Steinhorn, Jason and Mark Kohler. "Enhancing TV with ATVEF" Embedded Systems Programming, Oct. 1999, pp. 55-64.*

(Continued)

*Primary Examiner*—John W Miller
*Assistant Examiner*—Chris Parry
(74) *Attorney, Agent, or Firm*—Schwegman, Lundberg, Woessner, P.A.

(57) ABSTRACT

A data modification system and method for selective insertion of local meta data into an incoming data stream, the incoming data stream having a video data component and a meta data component. The data modification system comprises an incoming data terminal, a local data terminal, and a data modification unit coupled to the incoming data terminal and the local data terminal, wherein the data modification unit is adapted to selectively combine data from the incoming data terminal and the local data terminal. The method comprises receiving a data signal, the data signal comprising a first data component and a second data component, separating the first data component from the second data component, determining whether to modify the second data component, retrieving a third data component from a database, merging the third data component with the first data component, and outputting the third data component and the first data component to a distribution terminal.

50 Claims, 4 Drawing Sheets

U.S. PATENT DOCUMENTS

| | | |
|---|---|---|
| 4,877,408 A | 10/1989 | Hartsfield |
| 4,894,789 A | 1/1990 | Yee |
| 4,905,094 A | 2/1990 | Pocock et al. |
| 4,931,865 A | 6/1990 | Scarampi |
| 4,941,040 A | 7/1990 | Pocock et al. |
| 5,014,125 A | 5/1991 | Pocock et al. |
| 5,114,155 A | 5/1992 | Tillery et al. |
| 5,128,752 A | 7/1992 | Von Kohorn |
| 5,140,419 A | 8/1992 | Galumbeck et al. |
| 5,191,410 A | 3/1993 | McCalley et al. |
| 5,208,659 A | 5/1993 | Rhodes |
| 5,243,528 A | 9/1993 | Lefebvre |
| 5,262,860 A | 11/1993 | Fitzpatrick et al. |
| 5,264,933 A | 11/1993 | Rosser et al. |
| 5,282,028 A | 1/1994 | Johnson et al. |
| 5,285,278 A | 2/1994 | Holman |
| 5,291,486 A | 3/1994 | Koyanagi |
| 5,353,283 A | 10/1994 | Tsuchiya |
| 5,359,510 A | 10/1994 | Sabaliauskas |
| 5,365,346 A | 11/1994 | Abumi |
| 5,438,355 A | 8/1995 | Palmer |
| 5,448,568 A * | 9/1995 | Delpuch et al. .......... 348/423.1 |
| 5,453,794 A | 9/1995 | Ezaki |
| 5,462,275 A | 10/1995 | Lowe et al. |
| 5,479,268 A | 12/1995 | Young et al. |
| 5,481,542 A | 1/1996 | Logston et al. |
| 5,498,000 A | 3/1996 | Cuneo |
| 5,526,035 A | 6/1996 | Lappington et al. |
| 5,534,913 A | 7/1996 | Majeti et al. |
| 5,537,141 A | 7/1996 | Harper et al. |
| 5,539,471 A | 7/1996 | Myhrvold et al. |
| 5,543,849 A | 8/1996 | Long |
| 5,553,221 A | 9/1996 | Reimer et al. |
| 5,557,316 A | 9/1996 | Hoarty et al. |
| 5,564,073 A | 10/1996 | Takahisa |
| 5,568,390 A | 10/1996 | Hirota et al. |
| 5,570,295 A | 10/1996 | Isenberg et al. |
| 5,572,442 A | 11/1996 | Schulhof et al. |
| 5,579,055 A | 11/1996 | Hamilton et al. |
| 5,585,858 A | 12/1996 | Harper et al. |
| 5,586,257 A | 12/1996 | Perlman |
| 5,586,937 A | 12/1996 | Menashe |
| 5,589,892 A | 12/1996 | Knee et al. |
| 5,593,349 A | 1/1997 | Miguel et al. |
| 5,600,364 A * | 2/1997 | Hendricks et al. ............... 725/9 |
| 5,603,078 A | 2/1997 | Henderson et al. |
| 5,604,542 A | 2/1997 | Dedrick |
| 5,610,653 A | 3/1997 | Abecassis |
| 5,612,730 A | 3/1997 | Lewis |
| RE35,498 E | 4/1997 | Barnard |
| 5,619,249 A | 4/1997 | Billock et al. |
| 5,627,978 A | 5/1997 | Altom et al. |
| 5,633,810 A | 5/1997 | Mandal et al. |
| 5,633,918 A | 5/1997 | Mankovitz |
| 5,637,844 A | 6/1997 | Eiba |
| 5,640,193 A | 6/1997 | Wellner |
| 5,643,088 A | 7/1997 | Vaughn et al. |
| 5,649,284 A | 7/1997 | Yoshinobu |
| 5,659,366 A | 8/1997 | Kerman |
| 5,667,708 A | 9/1997 | Glass et al. |
| 5,668,592 A | 9/1997 | Spaulding, II |
| 5,677,708 A | 10/1997 | Matthews, III et al. |
| 5,679,075 A | 10/1997 | Forrest et al. |
| 5,686,954 A | 11/1997 | Yoshinobu et al. |
| 5,691,986 A | 11/1997 | Pearlstein |
| 5,694,163 A | 12/1997 | Harrison |
| 5,695,400 A | 12/1997 | Fennell, Jr. et al. |
| 5,696,905 A | 12/1997 | Reimer et al. |
| 5,697,844 A | 12/1997 | Von Kohorn |
| 5,710,884 A | 1/1998 | Dedrick |
| 5,724,091 A | 3/1998 | Freeman et al. |
| 5,724,103 A | 3/1998 | Batchelor |
| 5,724,521 A | 3/1998 | Dedrick |
| 5,724,567 A | 3/1998 | Rose et al. |
| 5,729,252 A | 3/1998 | Fraser |
| 5,730,654 A | 3/1998 | Brown |
| 5,734,413 A | 3/1998 | Lappington et al. |
| 5,734,437 A | 3/1998 | Back |
| 5,748,186 A | 5/1998 | Raman |
| 5,748,731 A | 5/1998 | Shepherd |
| 5,757,916 A | 5/1998 | MacDoran et al. |
| 5,758,079 A | 5/1998 | Ludwig et al. |
| 5,759,101 A | 6/1998 | Von Kohorn |
| 5,761,602 A | 6/1998 | Wagner et al. |
| 5,761,606 A | 6/1998 | Wolzien |
| 5,771,307 A | 6/1998 | Lu et al. |
| 5,771,381 A | 6/1998 | Jones et al. |
| 5,774,664 A | 6/1998 | Hidary et al. |
| 5,778,181 A | 7/1998 | Hidary et al. |
| 5,779,549 A | 7/1998 | Walker et al. |
| 5,782,692 A | 7/1998 | Stelovsky |
| 5,793,365 A | 8/1998 | Tang et al. |
| 5,796,393 A | 8/1998 | MacNaughton et al. |
| 5,796,952 A | 8/1998 | Davis et al. |
| 5,798,785 A | 8/1998 | Hendricks et al. |
| 5,801,750 A | 9/1998 | Kurihara |
| 5,813,006 A | 9/1998 | Polnerow et al. |
| 5,818,441 A | 10/1998 | Throckmorton et al. |
| 5,819,261 A | 10/1998 | Takahashi et al. |
| 5,823,879 A | 10/1998 | Goldberg et al. |
| 5,832,496 A | 11/1998 | Anand et al. |
| 5,846,132 A | 12/1998 | Junkin |
| 5,848,373 A | 12/1998 | DeLorme et al. |
| 5,848,396 A | 12/1998 | Gerace |
| 5,848,397 A | 12/1998 | Marsh et al. |
| 5,855,516 A | 1/1999 | Eiba |
| 5,861,881 A | 1/1999 | Freeman et al. |
| 5,867,208 A | 2/1999 | McLaren |
| 5,870,558 A | 2/1999 | Branton, Jr. et al. |
| 5,878,222 A | 3/1999 | Harrison |
| 5,878,223 A | 3/1999 | Becker et al. |
| 5,880,720 A | 3/1999 | Iwafune et al. |
| 5,889,950 A * | 3/1999 | Kuzma ........................ 725/37 |
| 5,889,951 A | 3/1999 | Lombardi |
| 5,890,906 A | 4/1999 | Macri et al. |
| 5,890,963 A | 4/1999 | Yen |
| 5,892,909 A | 4/1999 | Grasso et al. |
| 5,894,556 A | 4/1999 | Grimm et al. |
| 5,905,865 A | 5/1999 | Palmer et al. |
| 5,907,322 A | 5/1999 | Kelly et al. |
| 5,907,680 A | 5/1999 | Nielsen |
| 5,912,700 A | 6/1999 | Honey et al. |
| 5,913,040 A | 6/1999 | Rakavy et al. |
| 5,917,725 A | 6/1999 | Thacher et al. |
| 5,918,009 A | 6/1999 | Gehani et al. |
| 5,918,014 A | 6/1999 | Robinson |
| 5,920,856 A | 7/1999 | Syeda-Mahmood |
| 5,926,179 A | 7/1999 | Matsuda et al. |
| 5,929,849 A | 7/1999 | Kikinis |
| 5,929,850 A | 7/1999 | Broadwin et al. |
| 5,933,822 A | 8/1999 | Braden-Harder et al. |
| 5,937,331 A * | 8/1999 | Kalluri et al. ............... 725/146 |
| 5,940,082 A | 8/1999 | Brinegar et al. |
| 5,940,595 A | 8/1999 | Reber et al. |
| 5,941,774 A | 8/1999 | Takemoto et al. |
| 5,946,664 A | 8/1999 | Ebisawa et al. |
| 5,947,747 A | 9/1999 | Walker et al. |
| 5,948,040 A | 9/1999 | DeLorme et al. |
| 5,951,636 A | 9/1999 | Zerber |
| 5,954,798 A | 9/1999 | Shelton et al. |
| 5,956,038 A | 9/1999 | Rekimoto |
| 5,961,603 A | 10/1999 | Kunkel et al. |
| 5,973,685 A | 10/1999 | Schaffa et al. |
| 5,978,833 A | 11/1999 | Pashley et al. |

| Patent | Date | Name | | Patent | Date | Name |
|---|---|---|---|---|---|---|
| 5,987,454 A | 11/1999 | Hobbs | | 6,288,753 B1 | 9/2001 | DeNicola et al. |
| 5,987,523 A | 11/1999 | Hind et al. | | 6,289,362 B1 | 9/2001 | Van Der Meer |
| 5,999,664 A | 12/1999 | Mahoney et al. | | 6,292,780 B1 | 9/2001 | Doederlein et al. |
| 5,999,929 A | 12/1999 | Goodman | | 6,297,748 B1 | 10/2001 | Lappenbusch et al. |
| 6,002,394 A | 12/1999 | Schein et al. | | 6,298,330 B1 | 10/2001 | Gardenswartz et al. |
| 6,005,561 A | 12/1999 | Hawkins et al. | | 6,317,722 B1 | 11/2001 | Jacobi et al. |
| 6,006,252 A | 12/1999 | Wolfe | | 6,317,780 B1 | 11/2001 | Cohn et al. |
| 6,006,256 A * | 12/1999 | Zdepski et al. ............... 725/114 | | 6,317,791 B1 | 11/2001 | Cohn et al. |
| 6,006,265 A | 12/1999 | Rangan et al. | | 6,326,982 B1 | 12/2001 | Wu et al. |
| 6,009,458 A | 12/1999 | Hawkins et al. | | 6,327,574 B1 | 12/2001 | Kramer et al. |
| 6,012,083 A | 1/2000 | Savitzy et al. | | 6,330,592 B1 | 12/2001 | Makuch et al. |
| 6,018,768 A | 1/2000 | Ullman et al. | | 6,353,933 B1 | 3/2002 | Love |
| 6,023,729 A | 2/2000 | Samuel et al. | | 6,366,914 B1 | 4/2002 | Stern |
| 6,026,369 A | 2/2000 | Capek | | 6,389,458 B2 | 5/2002 | Shuster |
| 6,026,375 A | 2/2000 | Hall et al. | | 6,397,220 B1 | 5/2002 | Deisinger et al. |
| 6,029,045 A * | 2/2000 | Picco et al. ................... 725/34 | | 6,400,407 B1 * | 6/2002 | Zigmond et al. ............ 348/465 |
| 6,029,172 A | 2/2000 | Jorna et al. | | 6,412,011 B1 | 6/2002 | Agraharam et al. |
| 6,029,195 A | 2/2000 | Herz | | 6,424,979 B1 | 7/2002 | Livingston et al. |
| 6,044,403 A | 3/2000 | Gerszberg et al. | | 6,425,012 B1 | 7/2002 | Trovato et al. |
| 6,047,235 A | 4/2000 | Hiyokawa et al. | | 6,442,590 B1 | 8/2002 | Inala et al. |
| 6,049,821 A | 4/2000 | Theriault et al. | | 6,442,598 B1 | 8/2002 | Wright et al. |
| 6,055,569 A | 4/2000 | O'Brien et al. | | 6,442,687 B1 | 8/2002 | Savage |
| 6,057,856 A | 5/2000 | Miyashita et al. | | 6,456,854 B1 | 9/2002 | Chern et al. |
| 6,058,430 A | 5/2000 | Kaplan | | 6,457,010 B1 | 9/2002 | Eldering et al. |
| 6,061,738 A | 5/2000 | Osaku et al. | | 6,459,427 B1 | 10/2002 | Mao et al. |
| 6,064,438 A | 5/2000 | Miller | | 6,460,180 B1 | 10/2002 | Park et al. |
| 6,065,059 A | 5/2000 | Shieh et al. | | 6,463,585 B1 | 10/2002 | Hendricks et al. |
| 6,075,527 A | 6/2000 | Ichihashi et al. | | 6,466,929 B1 | 10/2002 | Brown et al. |
| 6,080,063 A | 6/2000 | Khosla | | 6,466,969 B1 | 10/2002 | Bunney et al. |
| 6,081,830 A | 6/2000 | Schindler | | 6,480,885 B1 | 11/2002 | Olivier |
| 6,082,887 A | 7/2000 | Feuer et al. | | 6,486,892 B1 | 11/2002 | Stern |
| 6,094,677 A | 7/2000 | Capek et al. | | RE37,957 E | 1/2003 | Garfield |
| 6,098,085 A | 8/2000 | Blonder et al. | | 6,510,466 B1 | 1/2003 | Cox et al. |
| 6,101,180 A | 8/2000 | Donahue et al. | | 6,513,069 B1 | 1/2003 | Abato et al. |
| 6,102,797 A | 8/2000 | Kail | | 6,526,041 B1 | 2/2003 | Shaffer et al. |
| 6,102,969 A | 8/2000 | Christianson et al. | | 6,526,335 B1 | 2/2003 | Treyz et al. |
| 6,108,703 A | 8/2000 | Leighton et al. | | 6,530,084 B1 * | 3/2003 | Del Sesto et al. ............. 725/61 |
| 6,112,181 A | 8/2000 | Shear et al. | | 6,560,777 B2 * | 5/2003 | Blackketter et al. ......... 725/110 |
| 6,112,192 A | 8/2000 | Capek | | 6,571,234 B1 | 5/2003 | Knight et al. |
| 6,112,212 A | 8/2000 | Heitler | | 6,577,716 B1 | 6/2003 | Minter et al. |
| 6,119,165 A | 9/2000 | Li et al. | | 6,578,025 B1 | 6/2003 | Pollack et al. |
| 6,122,647 A | 9/2000 | Horowitz et al. | | 6,606,657 B1 | 8/2003 | Zilberstein et al. |
| 6,122,658 A | 9/2000 | Chaddha | | 6,611,872 B1 | 8/2003 | McCanne |
| 6,126,547 A | 10/2000 | Ishimoto | | 6,615,408 B1 | 9/2003 | Kaiser et al. |
| 6,128,482 A | 10/2000 | Nixon et al. | | 6,625,624 B1 | 9/2003 | Chen et al. |
| 6,131,120 A | 10/2000 | Reid | | 6,625,647 B1 | 9/2003 | Barrick et al. |
| 6,134,584 A | 10/2000 | Chang et al. | | 6,643,691 B2 | 11/2003 | Austin |
| 6,138,144 A | 10/2000 | DeSimone et al. | | 6,661,372 B1 | 12/2003 | Girerd et al. |
| 6,141,010 A | 10/2000 | Hoyle | | 6,698,020 B1 | 2/2004 | Zigmond et al. |
| 6,144,848 A | 11/2000 | Walsh et al. | | 6,725,159 B2 | 4/2004 | Krasner |
| 6,144,991 A | 11/2000 | England | | 6,760,749 B1 | 7/2004 | Dunlap et al. |
| 6,151,626 A | 11/2000 | Tims et al. | | 6,799,326 B2 * | 9/2004 | Boylan et al. .................. 725/35 |
| 6,163,803 A | 12/2000 | Watanabe | | 6,938,270 B2 * | 8/2005 | Blackketter et al. ......... 725/112 |
| 6,173,317 B1 | 1/2001 | Chaddha et al. | | 7,028,327 B1 * | 4/2006 | Dougherty et al. ............ 725/93 |
| 6,177,931 B1 | 1/2001 | Alexander et al. | | 7,069,571 B1 * | 6/2006 | Del Sesto et al. ............. 725/14 |
| 6,182,072 B1 | 1/2001 | Leak et al. | | 7,103,904 B1 * | 9/2006 | Blackketter et al. ........... 725/32 |
| 6,182,116 B1 | 1/2001 | Namma et al. | | 2001/0000537 A1 | 4/2001 | Inala et al. |
| 6,192,340 B1 | 2/2001 | Abecassis | | 2001/0003823 A1 | 6/2001 | Mighdoll et al. |
| 6,192,394 B1 | 2/2001 | Gutfreund et al. | | 2001/0013123 A1 | 8/2001 | Freeman et al. |
| 6,193,610 B1 | 2/2001 | Junkin | | 2002/0056129 A1 | 5/2002 | Blackketter et al. |
| 6,195,680 B1 | 2/2001 | Goldszmidt et al. | | 2002/0112002 A1 | 8/2002 | Abato |
| 6,199,045 B1 | 3/2001 | Giniger et al. | | 2002/0156909 A1 | 10/2002 | Harrington |
| 6,204,842 B1 | 3/2001 | Fujii | | 2002/0188943 A1 | 12/2002 | Freeman et al. |
| 6,205,582 B1 | 3/2001 | Hoarty | | 2002/0194589 A1 | 12/2002 | Sheehan et al. |
| 6,239,797 B1 | 5/2001 | Hills et al. | | 2005/0097622 A1 * | 5/2005 | Zigmond et al. ............ 725/135 |
| 6,240,183 B1 | 5/2001 | Marchant | | 2007/0130581 A1 * | 6/2007 | Del Sesto et al. ............. 725/36 |
| 6,253,228 B1 | 6/2001 | Ferris et al. | | | | |
| 6,260,192 B1 | 7/2001 | Rosin et al. | | FOREIGN PATENT DOCUMENTS | | |
| 6,266,649 B1 | 7/2001 | Linden et al. | | | | |
| 6,275,705 B1 | 8/2001 | Drane et al. | | DE | 44 27 046 | 2/1996 |
| 6,278,942 B1 | 8/2001 | McDonough | | DE | 44 31 438 | 3/1996 |
| 6,279,007 B1 | 8/2001 | Uppala | | DE | 19545882 | 6/1997 |
| 6,285,407 B1 | 9/2001 | Yasuki et al. | | EP | 0 163 577 | 12/1985 |

| | | |
|---|---|---|
| EP | 0 314 572 | 5/1989 |
| EP | 0424648 A2 | 5/1991 |
| EP | 0 562 221 | 9/1993 |
| EP | 0 673 164 | 3/1995 |
| EP | 0 757 485 | 2/1997 |
| EP | 0 805 598 A1 | 11/1997 |
| EP | 0 837 609 A2 | 4/1998 |
| EP | 0852443 A | 7/1998 |
| EP | 0 879 536 | 11/1998 |
| EP | 0901284 A | 3/1999 |
| EP | 0952539 A2 | 10/1999 |
| EP | 0 982 943 | 5/2000 |
| EP | 1089201 A1 | 4/2001 |
| EP | 1111914 A | 6/2001 |
| GB | 2 132 856 | 7/1984 |
| GB | 2 325 537 | 11/1998 |
| GB | 2 327 837 | 2/1999 |
| GB | 2 347 055 | 8/2000 |
| GB | 2 350 213 | 11/2000 |
| GB | 2356319 A | 5/2001 |
| GB | 2 359 708 | 8/2001 |
| GB | 2 359 958 | 9/2001 |
| JP | 4-127688 | 4/1992 |
| JP | 5176306 | 7/1993 |
| JP | 7-288606 | 10/1995 |
| JP | 7-307813 | 11/1995 |
| JP | 8-8860 | 1/1996 |
| JP | 10-222541 | 8/1998 |
| WO | WO 93/06675 | 4/1993 |
| WO | WO 93/07713 | 4/1993 |
| WO | WO 93/11617 | 6/1993 |
| WO | WO 93/22877 | 11/1993 |
| WO | WO 94/13107 | 6/1994 |
| WO | WO-96/04633 | 2/1996 |
| WO | WO 96/07270 | 3/1996 |
| WO | WO 96 08923 A | 3/1996 |
| WO | WO 96/13124 | 5/1996 |
| WO | WO 97/02689 | 1/1997 |
| WO | WO 97/02699 | 1/1997 |
| WO | WO 97/22207 | 6/1997 |
| WO | WO 97/27546 | 7/1997 |
| WO | WO 97/29591 | 8/1997 |
| WO | WO 97/33434 | 9/1997 |
| WO | WO-9808923 | 3/1998 |
| WO | WO-98-23080 A2 | 5/1998 |
| WO | WO-98-29956 A2 | 7/1998 |
| WO | WO-99/00163 | 1/1999 |
| WO | WO-99/14930 | 3/1999 |
| WO | WO-99-44159 A1 | 9/1999 |
| WO | WO 99/45726 | 9/1999 |
| WO | WO 99/50778 | 10/1999 |
| WO | WO-99-55066 A1 | 10/1999 |
| WO | WO 0002380 A2 * | 1/2000 |
| WO | WO 00/14987 | 3/2000 |
| WO | WO 00/36836 | 6/2000 |
| WO | WO 00/36886 | 6/2000 |
| WO | WO 00/43892 | 7/2000 |
| WO | WO 00 43899 A | 7/2000 |
| WO | WO-00-045599 A | 8/2000 |
| WO | WO 00/77664 | 12/2000 |
| WO | WO-01-015357 A | 3/2001 |
| WO | WO 0158159 A1 * | 8/2001 |
| WO | WO 02/065252 | 8/2002 |
| WO | WO 02/065318 | 8/2002 |

OTHER PUBLICATIONS

Dale Cripps, "Web TV over Digital Cable," May 4, 1998; http://web-star.com/hdtvnews/webtvoverdigitalcable.html; pp. 1-4.

Dale Cripps, "Internet TV Advertising," May 8, 1998; http://web-star.com/hdtvnews/internettvadvertising.html; pp. 1-3.

Dale Cripps, "Gates, TV, Interactivity,"May 5, 1998; pp. 1-4; http://web-star.com/hdtvnews/gatestvinteractivity.html.

"ICTV" Brochure (a reproduced copy provided); copyright 1988 by ICTV; 27 pages.

"TV Navigator" brochure; copyright 1997 by Network Computer, Inc.; 6 pages.

"Worldgate" brochure; copyright 1998 by Worldgate Communications; 12 pages.

Per Einar Dybvik and Hakon W. Lie, "Combining WWW/Mosaic with Realtime Multimedia Conferencing in Distance Education," The Second International WWW Conference '94, Mosaic and the Web, Advance Proceedings, vol. 1, Oct. 17-20, 1994 at 423.

Tak K. Woo et al., "A Synchronous Collaboration Tool for the World-Wide Web," the Second International WWW Conference '94, Mosaic and the Web, Advance Proceedings, vol. 1, Oct. 17-20, 1994, at 315.

Intercast Industry Group, Press Release, "Leaders in PC, Broadcast and Cable Industries Announce Formation of Industry Group to Promote New Digital Medium for the Home PC," Business Wire, Oct. 23, 1995.

The Intercast Industry Group, "Frequently Asked Questions," Fall 1996, pp. 1-7.

Vinay Kumar et al., "A Shared Web to Support Design Teams", Third Workshop on Enabling Technologies: Infrastructure for Collaborative Enterprises, Morgantown, West Virginia, Apr. 17-19, 1994 at 178.

Newsbytes, *"Different takes on Wedding TV to Web" Newsbytes*, 'Online! Mar. 1, 1999, XP002257234 Retrieved from the Interent : <URL:www.exn.ca/Stories/1999/03/01/04.asp>' retrieved on Oct. 9, 2003! * p. 1, last paragraph*.

Kieron Murphy, "HyperTV fuses Java with television" Javaworld, 'Online! May 1996, XP00257236 Retrieved from the Internet: <URL:www.javaworld.com/javaworld/jw-05-1996/jw-05-hypertv.html> 'retrieved on Oct. 9, 2003!.

Yu et al., "Design and Analysis of Look Ahead Scheduling Scheme To Support Pause-Resume For Video-On-Demand Applications", Multimedia Systems, vol. 3, No. 4, Jan. 1995, pp. 137-149, XP000576898.

Sandra Beudin, *"The Web is not TV, or is it?" DZINE*, 'Online! Dec. 31, 1996, XP002257234, Retrieved from the Interent: URL:www.exn.ca/stories/1999/03/01/04.asp> retrieved on Oct. 9, 2003.

Wittig et al., "Intelligent Media Agents In Interactve Television Systems", Proceedings of the International Conference on Multimedia Computing and Systems, Los Alamitos, CA, May 15, 1995, pp. 182-189, XP000603484.

"Funkschau Fachzeitschrift für elektronische Kommunikation", vol. 6/96 of Mar. 1, 1996, pp. 70-75. and English Translation of extract from Funkschau Fachzeitschrift für elektronische Kommunikation.

Nikkei BP Corp., "Intercast Using Gap Television Signal", Nikkei Electronics, Japan, Dec. 18, 1995, No. 651, p. 106.

Television Society, "Interactive Television Broadcast Using Character Broadcast System, Video Information and Broadcast Technology", Nov. 20, 1995, vol. 11, p. 1482-1487.

Cline et al., "DirectShow RTP Support for Adaptivity in Networked Multimedia Applications", Multimedia Computing and Systems, 1998, Proceedings, IEEE International Conference Jun. 28-Jul. 1, 1998, pp. 13-22.

Mannos, T.J., "Re: Web page prefetching?" located at <URL:http://dejanews.com> retrieved on Oct. 4, 2002, Deja News (Online), Dec. 1, 1997.

Eitz, "Combiners for Videotext Signals" Broadcast Technology Reports, translation of vol. 28, No. 6, Nov. 1984, pp. 273-289, XP002182048, Norderstedt, Germany.

Eitz: "Kombinierer fur Videotextsignale" Rundfunktechnishe Mitteilungen, vol. 28, No. 6, Nov. 1984, pp. 273-289, XP002182048, Norderstedt, Germany.

"Advanced Television Enhancement Forum Specification (ATVEF)", Comment Draft Version 1.0rl, Feb. 25, 1999, XP002142688.

Philippe Le Hegaret, Document Object Module (DOM), Architecture Domain, Jun. 21, 2001, 2 pages, www.w3.org/DOM/.

Stephan Gillich, Nicolas Pintaux, Jim Beveridge, Kimmo Loytana, Rod Walsh, Jack Lang, Jae-Soo-Yoon, ATVEF Integration with DVB Using IP/MPE, Dec. 20, 1999, 5 pages, www.atvef.com/library/atvef-dub-bindingR8.html.

Jason Steinhorn, Mark Kohler, Embedded Systems Programming—Enhancing TV with ATVEF, Mar. 28, 2000, 12 pages, www.embedded.com/1999/9910/9910ial.htm.

ATVEF, Enhanced Content Specification, Mar. 15, 2001, 37 pages, www.atvef.com/library/specl-1a.html.

"RealSystem G2 Production Guide," 1998-2000, pp. 75-79.

"Overview," located at www.claria.com/companyinfo/ visited on Mar. 1, 2005.

Almerot Quinn "IP Multicast Applications: Challenges and Solutions," IETF Draft retrieved from the Internet URL:http://www.cs.ucsb.edu/~almeroth/classes/S00.276/papers/McastApps.txt retrieved on Mar. 3, 2005; pp. 1-27.

Zabele Braudes "Requirements for Multicast Protocols," IETF RFC, retrieved from the Internet: URL:www.ietf.org/rfc/rfc1458.txt, May 1993, pp. 1-19.

Atnewyorkstaff: "ACTV Reinvents Internet Television Service," retrieved from the Internet: URL:http://www.atnewyork.com/news/article.php/249871 retrieved on Oct. 17, 2003; 1 page.

"European Application No. 01964711, Office Action dated Oct. 19, 2007".

* cited by examiner

SYSTEM AND METHOD FOR LOCAL META DATA INSERTION

The present application claims priority to U.S. provisional application No. 60/193,470, filed Mar. 31, 2000, which is hereby incorporated by reference.

FIELD OF THE INVENTION

The present invention pertains to interactive and enhanced television systems, and more particularly to incorporating local data content into a regional or national interactive television broadcast.

BACKGROUND OF THE INVENTION

New standards are making the delivery of internet-based and enhanced content through a television medium a reality. The Advanced Television Enhancement Forum (ATVEF) is a cross-industry group formed to specify a single public standard for delivering interactive and enhanced television experiences. The initial results of the ongoing collaborative effort are set forth in the ATVEF specification v1.1 r26, which is incorporated by reference. The ATVEF specification can also be found at http://www.atvef.com/library/spec1_1a.html. The ATVEF specification enables interactive television content to be authored using a variety of tools and deployed to a variety of television, set-top, and PC-based receivers. As the interactive television industry continues to develop more applications, the ATVEF standard will continue to expand.

The ATVEF specification furthers the convergence of personal computers and traditional television receivers. Predictions indicate that consumers will eventually own a single device that will have the widespread availability and ease-of-use of television, combined with the interactive power and flexibility of a PC. The ATVEF defines the standards used to create enhanced content for delivery over a variety of media, including analog (NTSC) and digital (ATSC) television broadcasts, and a variety of network formats, including wireless, cable, satellite, and the internet.

In addition to defining what enhanced television content looks like, the ATVEF specification also defines how the content is transported from the broadcaster to the receiver, and how the receiver is informed that it has enhancements available for a user to access. The display of enhanced TV content includes two primary steps: delivery of data resources (e.g. HTML pages) and display of named data resources that are synchronized by triggers. Triggers provide a link to the location of enhanced content. Two models of transport labeled "Transport type A" and "Transport type B" define the capability of networks to engage in one-way and/or two-way communication with a user.

Generally, the Transport type A model is for delivery of triggers by a forward path and for the pulling of data by a required return path. Transport type B is for delivery of both the triggers and the data by a forward path while the return path is optional. Specialized enhanced television receivers are generally required to display interactive television programming.

Transport type A is defined for ATVEF receivers that maintain a connection (commonly called a back-channel or return path) to the Internet. Generally, this network connection is provided by a dial-up modem, or can be provided by any type of bidirectional access channel (e.g. cable modem, DSL, TI, ISDN, satellite, etc.). Transport type A is a method for delivering triggers alone, without additional content. Because there is no content delivered with Transport type A, all additional data must be obtained over the back-channel, using the Uniform Resource Locators (URLs) passed with the trigger as a pointer to the additional content. For example, using the URL(s) in the trigger, content can be pulled from the Internet via one of the previously mentioned network connections.

Transport type B, on the other hand, provides for the simultaneous delivery of ATVEF triggers and the associated content. In this model, the broadcaster pushes the content to a user's receiver. The receiver then stores the content for later access. Transport type B uses announcements that are sent over the network to associate triggers with content streams. Generally, an announcement describes a content stream and may include information regarding bandwidth, storage requirements, and language (enhancements may be delivered in multiple languages). Since a Transport type B receiver stores any content that will be displayed, the receiver uses announcement information to make content storage decisions. For example, if a content stream requires more storage space than a particular receiver has available, the receiver can elect to discard some older content, or it may elect not to store the newer announced content stream. Receivers can be configured with varying amounts of local storage capabilities.

It should be noted that a single video program can contain both Transport type A data (e.g. broadcast data triggers) and Transport type B data (e.g. IP) simultaneously. This scenario is advantageous to target the widest range of receivers and therefore customers. Thus, both IP-based receivers as well as receivers that can only receive broadcast data triggers will be able to access the same information. Receivers can be configured to support only IP based trigger streams and ignore broadcast data triggers, to support broadcast data triggers in the absence of IP based triggers, or to support broadcast data triggers and IP based triggers simultaneously.

An ATVEF "binding" is the definition of how ATVEF runs on a particular network. The binding may support either or both Transport types A and B. Having one standard ATVEF binding for each network is necessary so that receivers and broadcast tools can be developed independently. The ATVEF binding provides the glue between the network specification and the ATVEF specification in cases where the network specification doesn't contain all the necessary information. Thus, for ATVEF to provide interoperability between broadcast networks and receivers, it is important that each physical network have only one binding. Additionally, it is equally important that each binding provide a fully comprehensive definition of the interface between the broadcast network specification and the ATVEF specification.

ATVEF has defined bindings for delivering data over IP (Internet protocol) multicasts as well as over NTSC (National Television System Committee) systems. Because the transmission of IP is already defined for virtually every type of television broadcast network, the binding to IP is considered a reference binding. With this reference binding, defining an ATVEF binding for a new network can be based upon a specification of how to run IP over that network.

To illustrate the binding mechanism, consider the binding of ATVEF to the NTSC video format. Here, the NTSC binding defines Transport type A using an NTSC-specific method, wherein ATVEF triggers are broadcast in line 21 of the vertical blanking interval (VBI). Transport type B, on the other hand, uses the IP reference binding for delivering IP datagrams over the other VBI lines.

Television enhancements for Transport type B include three related data sources: announcements (which can be delivered via the session announcement protocol (SAP)), content (which can be delivered via the unidirectional hypertext transfer protocol (UHTTP)), and triggers (which can be delivered via the trigger protocol over user datagram protocol (UDP)). Announcements are used to announce currently available programming to the receiver, can be broadcast on a single well-known multicast address and port, and have a time period for which they are valid. Announcements also indicate the multicast address and port number that the client can listen in on to receive the content and triggers. Details of the announcement and the announcement protocol are provided in section 3.1.1 of the ATVEF specification.

Triggers are real-time events broadcast inside IP multicast packets delivered on the address and port defined in the Session Description Protocol (SDP) announcement for the enhanced TV program. In general, when the client sees a new announcement on the known address and port, the client knows that there will be data available on the given content and trigger addresses. Triggers are also mechanisms used to alert receivers to incoming content enhancements. Among other information, every trigger contains a standard URL that specifies the location of the enhanced content. ATVEF content may be located locally (e.g., delivered over the broadcast network and cached to a disk) or it may reside on the Internet, another public network, or a private network (LAN/WAN). Triggers are described in greater detail in Section 1.1.5 of the ATVEF specification.

While broadcasters can utilize the features of an ATVEF based system to deliver enhanced information and programming to viewers, it is rarely practical to deliver the identical content to all end users. For example, advertising and other promotional material associated with a particular national television broadcast will not be uniformly applicable to all viewing markets and regions. It is thus desirable to modify or substitute certain information into the enhanced television broadcasts at various points in the broadcast distribution and to allow local and/or regional broadcasters to tailor a broadcast to their local market.

SUMMARY OF THE INVENTION

In one aspect, a device and method for selective data modification is disclosed. In a first embodiment the device comprises an incoming data terminal, a local data terminal, a data distribution terminal, and a data modification unit. The data modification unit is coupled to the incoming data terminal, local data terminal, and data distribution terminal and is adapted to selectively combine data from the incoming data terminal and the local data terminal in accordance with an instruction set. Preferably, the data modification unit comprises a data stripper, a processor configured to execute the instruction set, and an inserter.

In a further embodiment, the data modification system is adapted to selectively insert local meta data into an incoming data stream, where the incoming data stream has a video data component and a meta data component.

In a still further embodiment, a method of selectively modifying a data signal comprises receiving a data signal, the data signal comprising a first data component and a second data component, separating the first data component from the second data component, determining whether to modify the second data component, retrieving a third data component from a database, merging the third data component with the first data component, and outputting the third data component and the first data component to a distribution terminal.

As will become apparent to those skilled in the art, numerous other embodiments and aspects will become evident hereinafter from the following descriptions and claims.

BRIEF DESCRIPTION OF THE DRAWINGS

The drawings illustrate both the design and utility of the preferred embodiments of the present invention, wherein.

DETAILED DESCRIPTION

Figure 1:
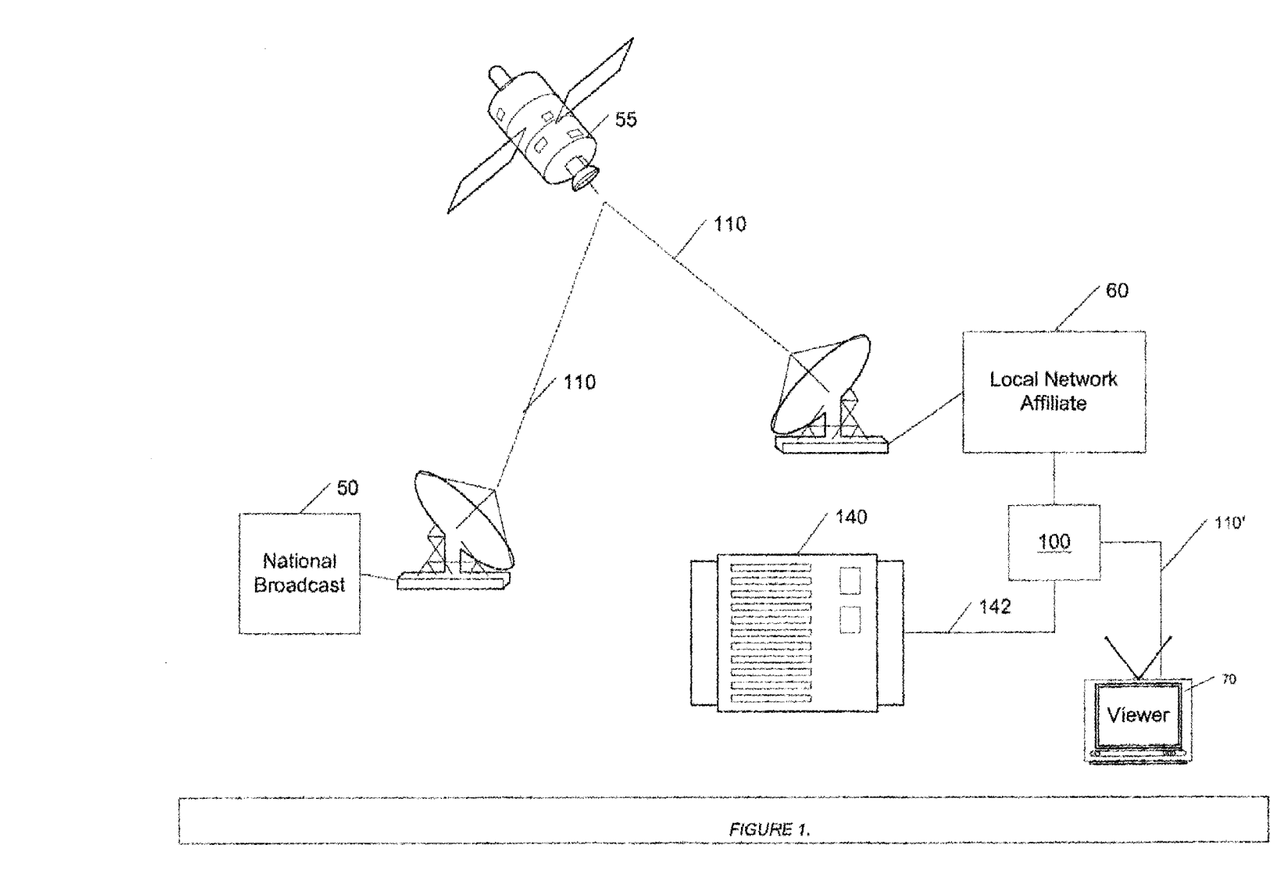
FIG. 1 is a diagram of a broadcasting network including a meta data substitution system constructed in accordance with the present invention.

As used herein, the term "meta data" refers to any type of enhanced television content. The term "local meta data" refers to enhanced television content added to a video broadcast at a point other than at the origination of the broadcast. FIG. 1 is a diagram of how a meta data substitution system 100 constructed in accordance with the present invention operates to insert local meta data content into a nationally broadcast television program. A national broadcaster 50 transmits its program signal 110 to a satellite 55. The signal 110 is then relayed by the satellite 55 to a local station or network affiliate 60. In addition to a video component, the signal 110 as transmitted by the national broadcaster 50 and received by the local affiliate 60 contains a generic meta data component that the network has associated with the video data component. A local meta data center 140 stores local meta data 142 that can be selectively associated with the national signal 110. The meta data substitution system 100 resides in proximity to the local station 60 and monitors the meta data content of the national signal 110. The meta data substitution system 100 determines whether to insert local meta data 142 into the national signal 110 before it is sent to a viewer 70. If meta data substitution occurs, a modified signal 110' is sent to the viewer 70 and includes the local meta data 142 particular to the viewer's city, state, or region.

Figure 2:
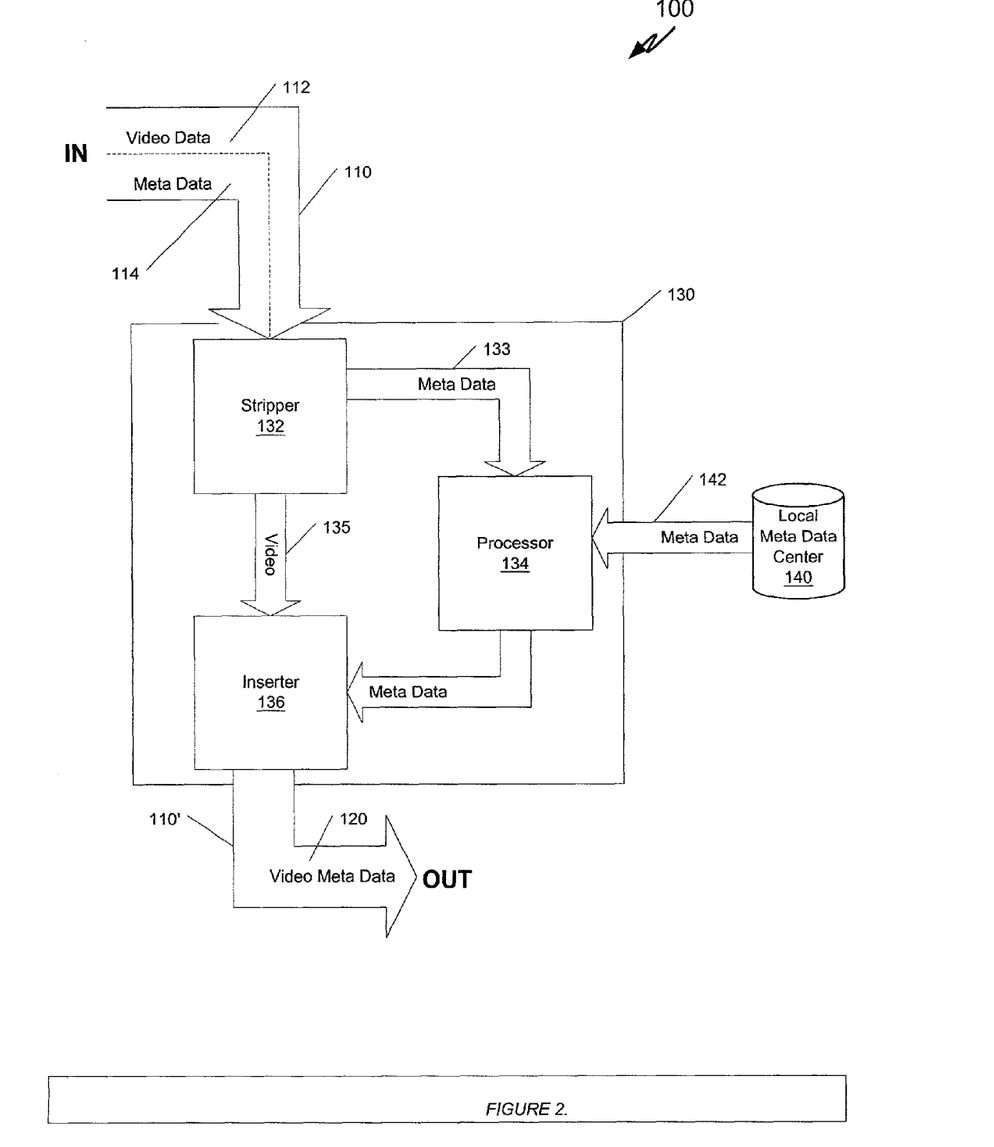
FIG. 2 is an embodiment of a meta data substitution system constructed in accordance with the present invention.

FIG. 2 shows the meta data substitution system 100 in more detail. The meta data substitution system 100 is generally operative to monitor the meta data content that is received in conjunction with an incoming broadcast signal 110. The broadcast signal 110 is an incoming signal in the form of an interne, cable, satellite, or terrestrial broadcast. Other forms of broadcast media axe also contemplated. The broadcast signal 110 may be formatted as an NTSC, MPEG2, HDTV, DVD, or DBS signal. The broadcast signal 110 includes two components: a video data component 112 and a meta data component 114. The meta data substitution system 100 determines whether the meta data component 114 should be replaced with a local version of the meta data (local meta data). In a typical distribution scenario, the original meta data component 114 associated with the broadcast signal 110 is replaced with customized local meta data 142 that is specifically tailored to the market where the broadcast is being received and distributed to viewers. The local meta data 142 is stored at the local meta data center 140. The local meta data center 140 can be an on-site or off-site data storage unit such as a local or wide area network, a hard disk, a Random Access Memory (RAM), a computer database, or any number of other known types of data storage facilities or devices.

The meta data component 114 may be generic informational material that pertains to a national advertising campaign (e.g. an automobile ad), or any other type of informational material commonly associated with broadcasting. The meta data component 114 is directly associated with the video data component 112 of the broadcast signal 110. This type of globally distributed national advertising campaign typically does not contain information that is tailored to any particular metropolitan area or geographic region. Accordingly, the meta data substitution system 100 can be used to replace all or part of the national automobile ad with advertising that is targeted to the particular metropolitan area. Information that may be included at the local level includes local pricing and dealer locations.

Figure 3:
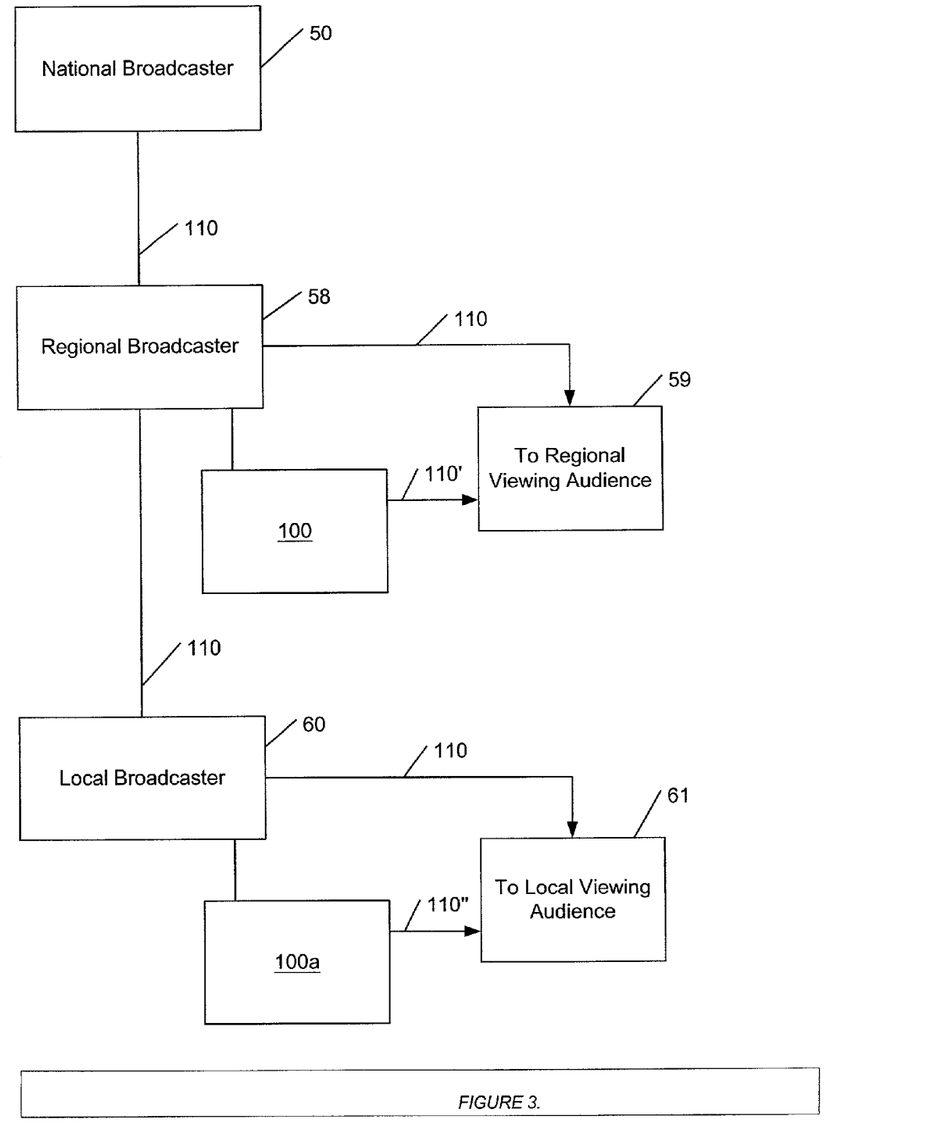
FIG. 3 is a broadcast flowchart showing a meta data distribution system constructed in accordance with the present invention.

Meta data substitution system 100 can be situated at any point downstream of the original point of video distribution (e.g. the national broadcaster 50 in FIG. 1). For example, meta data substitution system 100 can be situated at distribution points such as a regional television network, a local television network affiliate, a local cable head end, or an internet service provider. As can be further appreciated, meta data substitution system 100 can be situated at multiple distribution points, thereby creating a cascading data substitution effect. FIG. 3 depicts such a scenario. National broadcaster 50 initiates the broadcast signal 110. Thereafter, regional broadcaster 58 has the opportunity to modify or substitute data into the broadcast via meta data substitution unit 100 prior to distributing the broadcast signal to the regional viewing audience 59. Either a modified signal 110' or the original signal 110 can be broadcast to the regional viewing audience 59. Likewise, the regional broadcaster 58 can forward the original signal 110 to a local broadcaster 60 or another type of downstream broadcaster. Further down the distribution chain, local broadcaster 60 has its own opportunity to modify or substitute data into the broadcast via meta data substitution unit 100*a* before a locally modified signal 110" is passed to a local viewing audience 61. The local broadcaster 60 also has the discretion to broadcast the original signal 110. In this scenario, the enhanced content is increasingly tailored to the intended viewing audience.

Referring again to FIG. 2, meta data substitution system 100 includes a stripper 132, a processor 134, an inserter 136, and a local meta data center 140. Collectively the stripper 132, the processor 134, and the inserter 136 represent a generic meta data substitution component 130. For example, processor 134 may comprise a reprogrammable device or an Application Specific Integrated Circuit (ASIC). Preferably, each of the stripper 132, processor 134, and the inserter 136 have appropriate data terminals to facilitate the transfer of data into and out of the meta data substitution system 100. For example, the incoming data terminal of meta data substitution component 130 may be adapted to receive a data signal that conforms to a TCP/IP, ATVEF, or DOCSIS standard.

Figure 4:
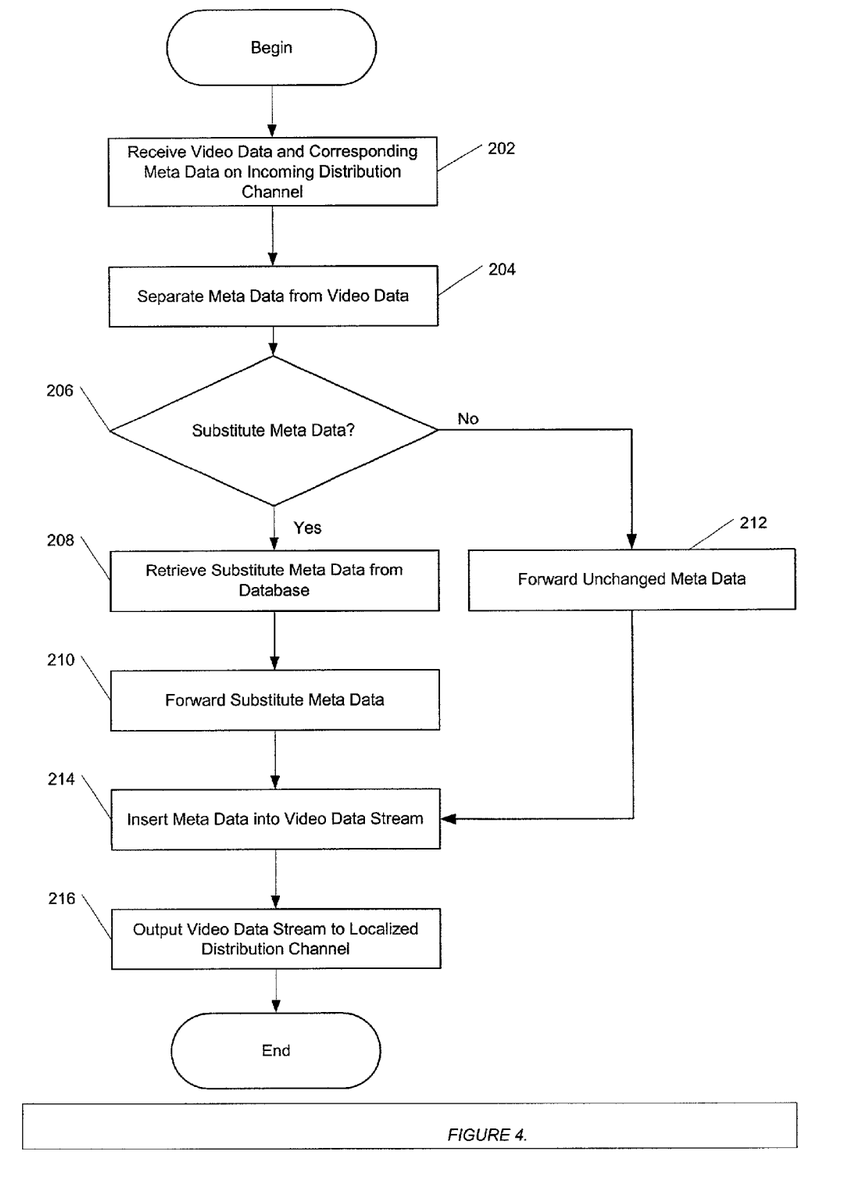
FIG. 4 is a flowchart showing a meta data substitution process.

A first embodiment of the operation of the meta data substitution system 100 is illustrated by the flowchart of FIG. 4 and will be described in conjunction with the diagram of FIG. 2. The operation depicted in FIG. 4 may be implemented with a set of computer-executable instructions that may be stored on a computer-readable medium. Beginning at 202 the broadcast signal 110, including both the video data component 112 and the meta data component 114, is received by the meta data substitution system 100. The video data component 112 and the corresponding meta data component 114 can be received in a variety of formats depending upon the particular type of network. In one example, the video data component 112 is delivered in NTSC format with the meta data component 114 (i.e., announcements, packages, and triggers) mapped to various lines of the vertical blanking interval.

After receipt of the video broadcast signal 110, the stripper 132, at 204, separates out the meta data component 114 from the video broadcast signal 110 resulting in extracted meta data 133 and remaining video data 135. This process is dependent upon the format of the received video broadcast signal 110 and the stripper 132 is preferably formatted to recognize and process a variety of known data formats. The extracted meta data 133 is then forwarded to the processor 134 and the remaining video data 135 is forwarded to the inserter 136.

The processor 134 is generally operative, at 206, to determine whether substitution of the extracted meta data 133 should occur. This determination is based upon variables defined by the originator of the meta data component 114. Such a determination can be based upon the nature of the meta data as defined by the specification of the announcements and triggers in relation to the type of substitution data being offered.

In one embodiment, the substitution determination can be based upon the specification of new "tve" options to the "A" parameter for a Transport B announcement. These and other variables and parameters are found in the ATVEF specification which was previously incorporated by reference. These new "tve" options are shown by the following examples:
1. A=tve-localInsertLevel:x
2. A=tve-region:regionName
3. A=tve-id:x In the first example, "x" is a priority level, "1" being the highest (can't overwrite) and "99" being the lowest (overwrite all the time). In this example, the processor 134 will compare the priority level in the extracted announcement to its own assigned priority value. If the priority level in the extracted announcement is lower than its own priority level, then substitution of the announcement is permissible. Conversely, if the priority level in the extracted announcement is higher, then substitution will not be allowed.

In the second example, the substitution determination is based upon the geographical region where the processor 134 operates. If the processor 134 is operating in the region named in the extracted announcement, then substitution is permissible. The converse is true if the processor is not operating in the extracted announcement.

In the third example, "x" is a unique ID. The value of the unique ID determines which processors 134 are permitted to substitute for the extracted announcement. In one embodiment, this determination process is based on a table lookup that defines the set of IDs that are permitted to perform the substitution.

In alternative embodiments, the substitution determination can be based upon the specification of new attribute options to the Transport type A or Transport type B triggers. These new attribute options can include the following definitions: localInsertLevel:int, region:string, and tveID:string. Each of these new attribute options will dictate a similar substitution determination process as discussed above. These attributes are further defined in the ATVEF specification which was previously incorporated by reference. These examples are not intended to be exhaustive and additional options can be defined to address specific distribution scenarios that require localized customization of embedded meta data.

If the processor 134 determines, at 206, that substitution is permissible, then the local meta data 142 is retrieved, at 208, from the local meta data center 140. The local meta data 142 is then forwarded, at 210, to inserter 136. The inserter 136 generates the final video data stream 110' that is to be output to a localized distribution channel 120. At 214, the inserter 136 inserts the substitute meta data 142 received from the processor 134 into the remaining video data 135. The insertion process is dependent upon the particular format of the video data and the inserter 136 is preferably formatted to accommodate a variety of known video formats.

Alternatively, if the processor 134 determines, at 206, that meta data substitution is not permissible, then the originally extracted meta data component 114 is forwarded, at 212, to the inserter 136. At 214, the inserter 136 then inserts the originally extracted meta data 133 back into the video data 135. Alternately, it is possible for the originally extracted meta data to still exist as part of the originally received video broadcast signal 110. In this scenario, the originally extracted meta data 133 need not be reinserted into the video data stream when the meta data has remained unchanged (i.e., no meta data substitution). Thus, in that case, the inserter 136 is operative to simply forward the entire video broadcast signal 110 that was originally received by the stripper 132.

After the substitute meta data 142 has been inserted, the inserter 136 outputs the repackaged video data stream 110' to the localized distribution channel 120 at 216. With data substitution, customized local content replaces the non-targeted generic content sent by the national broadcaster.

Although the present invention has been described and illustrated in the above description and drawings, it is understood that this description is by example only and that numerous changes and modifications can be made by those skilled in the art without departing from the true spirit and scope of the invention. The invention, therefore, is not to be restricted, except by the following claims and their equivalents.

What is claimed is:

1. A data modification device, said data modification device comprising:
    a data modification unit coupled to an incoming data terminal, a local data terminal, and a data distribution terminal, wherein the data modification unit is adapted to selectively combine data from the incoming data terminal and the local data terminal in accordance with an instruction set;
    a data stripper for extracting meta data parameters from a data signal wherein the extracted meta data parameters include a substitution determination parameter, said substitution determination parameter having an evaluation type field for specifying an evaluation type and an evaluation value field for specifying an evaluation value to correspond with the evaluation type, the evaluation type and evaluation value for determining when a subset of original broadcast meta data in said data signal should be replaced, wherein the evaluation type is selected from the group comprising of priority comparison, string comparison, and numeric comparison and the evaluation value is selected from the group comprising of priority level, geographical information, and unique ID;
    an evaluator for evaluating the substitution determination parameter, said evaluator performing an evaluation of said evaluation type on said evaluation value with respect to a local state of said data modification device; and
    an inserter for substituting said subset of original broadcast meta data in the data signal with local meta data based on the evaluator comparison.

2. The data modification device as set forth in claim 1, wherein the evaluation type of the substitution parameter comprises a comparison and the evaluation value of said substitution determination parameter comprises a multi-level priority value.

3. The data modification device as set forth in claim 1, wherein the evaluation type of the substitution parameter comprises a string comparison and the evaluation value of said substitution determination parameter comprises a geographic region name value.

4. The data modification device as set forth in claim 1, wherein the evaluation type of the substitution parameter comprises a comparison and the evaluation value of said substitution determination parameter comprises a unique identifier for said data modification device.

5. The data modification device as set forth in claim 1, wherein the incoming data terminal is adapted to receive a data signal that conforms to a TCP/IP standard.

6. The data modification device as set forth in claim 1, wherein the incoming data terminal is adapted to receive a data signal that conforms to an ATVEF standard.

7. The data modification device as set forth in claim 1, wherein the incoming data terminal is adapted to receive a data signal that conforms to a DOCSIS standard.

8. The data modification device as set forth in claim 1, wherein a format of the data on said incoming data terminal is an NTSC format.

9. The data modification device as set forth in claim 1, wherein a format of the data on said incoming data terminal is an MPEG2 format.

10. The data modification device as set forth in claim 1, wherein a format of the data on said incoming data terminal is an HDTV format.

11. The data modification device as set forth in claim 1, wherein a format of the data on said incoming data terminal is an DVD format.

12. The data modification device as set forth in claim 1, wherein a format of the data on said incoming data terminal is an DBS format.

13. The data modification device as set forth in claim 1, wherein the data signal comprises a video data component and a meta data component.

14. The data modification device as set forth in claim 1, wherein the local data terminal is adapted to receive a data signal from a storage device.

15. The data modification device as set forth in claim 14, wherein the storage device is a recordable disk.

16. The data modification device as set forth in claim 14, wherein the storage device is a RAM.

17. The data modification device as set forth in claim 14, wherein the storage device is a computer database.

18. The data modification device as set forth in claim 1, wherein the data distribution terminal is adapted to transmit a data signal to a distribution channel.

19. The data modification device as set forth in claim 1, wherein the data stripper is adapted to separate an incoming signal into a video data component and a meta data component.

20. The data modification device as set forth in claim 1, wherein the evaluator is a reprogrammable device.

21. The data modification device as set forth in claim 1, wherein the evaluator is an ASIC.

22. The data modification device as set forth in claim 1, further comprising a receiver adapted to display the combined data from the incoming data terminal and the local data terminal.

23. The data modification device as set forth in claim 22, wherein the receiver is an NTSC enabled television.

24. The data modification device as set forth in claim 22, wherein the receiver is an HDTV enabled television.

25. The data modification device as set forth in claim 22, wherein the receiver is an MPEG2 enabled television.

26. The data modification device as set forth in claim 22, wherein the receiver is an DVD enabled television.

27. The data modification device as set forth in claim 22, wherein the receiver is an DBS enabled television.

28. A data modification system for selective insertion of local meta data into an incoming data stream, the incoming data stream having a video data component and a meta data component, the data modification system comprising:
    a data modification unit coupled to an incoming data terminal and a local data terminal, wherein the data modification unit is adapted to selectively combine data from the incoming data terminal and the local data terminal,
    a data stripper for extracting meta data parameters from the incoming data stream wherein the extracted meta data parameters include a substitution determination parameter, said substitution determination parameter having an evaluation type field for specifying an evaluation type and an evaluation value field for specifying an evaluation value to correspond with the evaluation type, the evaluation type and evaluation value for determining when a subset of original broadcast meta data in said incoming data stream should be replaced, wherein the evaluation type is selected from the group comprising of priori comparison, and numeric comparison and the evaluation value is selected from the group comprising of priority level, geographical information, and unique ID;
    an evaluator for evaluating the substitution determination parameter, said evaluator performing an evaluation of said evaluation type on said evaluation value with respect to a local state of said data modification system; and
    an inserter for substituting said subset of original broadcast meta data in the incoming data stream with local meta data based on the evaluator comparison.

29. The data modification system as set forth in claim 28, wherein the evaluation type of the substitution parameter comprises a comparison and the evaluation value of said substitution determination parameter comprises a multi-level priority value.

30. The data modification system as set forth in claim 28, wherein the evaluation type of the substitution parameter comprises a string comparison and the evaluation value of said substitution determination parameter comprises a geographic region name value.

31. A method of selectively modifying a data signal, said method comprising:
    receiving a data signal, the data signal comprising a first data component and a second data component;
    separating the first data component from the second data component;
    extracting meta data parameters from the data signal wherein the extracted meta data parameters include a substitution determination parameter, said substitution determination parameter having an evaluation type field for specifying an evaluation type and an evaluation value field for specifying an evaluation value to correspond with the evaluation type, the evaluation type and evaluation value for determining when a subset of original broadcast meta data in said data signal should be replaced, wherein the evaluation type is selected from the group comprising of priority comparison, string comparison, and numeric comparison and the evaluation value is selected from the group comprising of priority level, geographical information, and unique ID;
    determining whether to replace a subset of the second data component by performing an evaluation of the evaluation type on said evaluation value with respect to a local state;
    retrieving a third data component from a database, wherein the third data component includes local meta data from a local meta data center; and
    replacing a subset of said second data component with the third data component based on the evaluation.

32. The method as set forth in claim 31, wherein the evaluation type of the substitution parameter comprises a comparison and the evaluation value of said substitution determination parameter comprises a multi-level priority value.

33. The method as set forth in claim 31, wherein the evaluation type of the substitution parameter comprises a string comparison and the evaluation value of said substitution determination parameter comprises a geographic region name value.

34. The method as set forth in claim 31, wherein the substitution determination parameter comprises a unique identifier for a machine implementing said method.

35. The method as set forth in claim 31, where the first data component comprises video.

36. A method of selectively modifying a data signal, said method comprising:
    receiving a data signal, the data signal comprising a first data component and a second data component;
    separating the first data component from the second data component wherein the second data component further comprises meta data parameters and wherein the meta data parameters include a substitution determination parameter, said substitution determination parameter having an evaluation type field for specifying an evaluation type and an evaluation value field for specifying an evaluation value to correspond with the evaluation type, the evaluation type and evaluation value for determining when a subset of original broadcast meta data in said data signal should be replaced, wherein the evaluation type is selected from the group comprising of priority comparison, string comparison, and numeric comparison and the evaluation value is selected from the group comprising of priority level, geographical information, and unique ID;
    determining whether to replace a subset of the second data component by performing an evaluation of the evaluation type on said evaluation value with respect to a local state;
    if replacement of said subset of the second data component is not required then
        forwarding the second data component, and
        merging the forwarded second data component with the first data component; and
    if replacement of said subset of the second data component is required then
        retrieving a third data component from a database, wherein the third data component includes local meta data from a local meta data center,
        forwarding the third data component, and
        replacing a subset of said second data component with the third data component.

37. The method as set forth in claim 36, wherein the evaluation type of the substitution parameter comprises a comparison and the evaluation value of said substitution determination parameter comprises a multi-level priority value and said local state comprises a local priority value.

38. The method as set forth in claim 36, wherein the evaluation type of the substitution parameter comprises a string comparison and the evaluation value of said substitution determination parameter comprises a geographic region name value and said local state comprises a local geographic name value.

39. A data modification system for selective insertion of local meta data into a data stream, the data stream having a video data component and a meta data component, the data modification system comprising:
    a data stripper for extracting meta data parameters from the data stream wherein the extracted meta data parameters include a substitution determination parameter, said substitution determination parameter having an evaluation type field for specifying an evaluation type and an evaluation value field for specifying an evaluation value to correspond with the evaluation type, the evaluation type and evaluation value for determining when a subset of original broadcast meta data in said data signal should be replaced, wherein the evaluation type is selected from the group comprising of priority comparison, string comparison, and numeric comparison and the evaluation value is selected from the group comprising of priority level, geographical information, and unique ID;
    a data storage device for storing local meta data;
    a processor coupled to the data storage device and the data stripper, the processor for evaluating the extracted substitution determination parameter, said processor performing an evaluation of said evaluation type on said evaluation value with respect to a local state of said data modification system; and
    a data insertion unit coupled to the processor, the data insertion unit for replacing said subset of meta data component with local meta data.

40. A data modification system for selective insertion of local meta data into a data stream, the data stream having a video data component and a meta data component, the data modification system comprising:
    means for extracting meta data parameters from the data stream wherein the extracted meta data parameters include a substitution determination parameter, said substitution determination parameter having an evaluation type field for specifying an evaluation type and an evaluation value field for specifying an evaluation value to correspond with the evaluation type, the evaluation type and evaluation value for determining when a subset of original broadcast meta data in said data signal should be replaced, wherein the evaluation type is selected from the group comprising of priority comparison, string comparison, and numeric comparison and the evaluation value is selected from the group comprising of priority level, geographical information, and unique ID;
    means for storing the local meta data;
    means for evaluating the extracted substitution determination parameter, said means for evaluating performing an evaluation of said evaluation type on said evaluation value with respect to a local state of said data modification system; and
    means for replacing said subset of original broadcast meta data with local meta data based on the evaluation of the extracted substitution determination parameter.

41. A computer-readable medium having computer executable instructions for performing a method of selectively modifying a data signal, the method comprising:
    receiving a data signal, the data signal comprising a first data component and a second data component;
    separating the first data component from the second data component;
    extracting meta data parameters from second data component wherein the extracted meta data parameters include a substitution determination parameter, said substitution determination parameter having an evaluation type field for specifying an evaluation type and an evaluation value field for specifying an evaluation value to correspond with the evaluation type, the evaluation type and evaluation value for determining when a subset of original broadcast meta data in said data signal should be replaced, wherein the evaluation type is selected from the group comprising of priority comparison, string comparison, and numeric comparison and the evaluation value is selected from the group comprising of priority level, geographical information, and unique ID;
    determining whether to replace a subset of the second data component by performing an evaluation of the evaluation type on said evaluation value with respect to a local state;
    if replacement of said subset of the second data component is not required then
        forwarding the second data component,
        merging the forwarded second data component with the first data component; and
    if replacement of said subset of the second data component is required then
        retrieving a third data component from a database, wherein the third data component includes local meta data from a local meta data center,
        forwarding the third data component,
        replacing a subset of said second data component with the third data component based on the evaluation.

42. A method of controlling distribution of enhanced television content for viewers using a data modification device, said method comprising:
    receiving a broadcast signal comprising a video component and a generic meta data component within said data modification device, the generic meta data component comprising triggers and broadcast meta data;
    extracting meta data parameters from the generic meta data component wherein the extracted meta data parameters include a substitution determination parameter, said substitution determination parameter having an evaluation type field for specifying an evaluation type and an evaluation value field for specifying an evaluation value to correspond with the evaluation type, the evaluation type and evaluation value for determining when a subset of original broadcast meta data in said data signal should be replaced, wherein the evaluation type is selected from the group comprising of priority comparison, string comparison, and numeric comparison and the evaluation value is selected from the group comprising of priority level, geographical information, and unique ID;
    performing an evaluation of the evaluation type on said evaluation value with respect to a local state to determine whether to replace said subset of said broadcast meta data with local meta data;
    replacing said subset of said broadcast meta data with the local meta data in response to a determination in the evaluating step to obtain a modified broadcast signal; and
    broadcasting the modified broadcast signal to the viewers in a local market.

43. The method of controlling distribution of enhanced television content for viewers using said data modification device as set forth in claim 42 wherein the evaluation type of the substitution parameter comprises a comparison and the evaluation value of said substitution determination parameter comprises a multi-level priority value and said state comprises a local multi-level priority value.

44. The method of controlling distribution of enhanced television content for viewers using said data modification device as set forth in claim 42 wherein:
   the generic meta data component further comprises content; and
   the local meta data comprises triggers and content.

45. The method of controlling distribution of enhanced television content for viewers using said data modification device as set forth in claim 42, said method further comprising:
   repeating the evaluation of the evaluation type on said evaluation value with respect to said local state; and
   broadcasting the broadcast signal to the viewers in response to a determination in the repeated evaluating step to not make the insertion.

46. The method of controlling distribution of enhanced television content for viewers using said data modification device as set forth in claim 45 wherein the substitution determination parameter comprises a geographic region identifier parameter and said local state comprises a geographic identifier.

47. The method of controlling distribution of enhanced television content for viewers using said data modification device as set forth in claim 44, said method further comprising:
   stripping the generic meta data component from the broadcast signal prior to the evaluating step.

48. The method of controlling distribution of enhanced television content for viewers using said data modification device as set forth in claim 47, said method further comprising:
   repeating the evaluation of the evaluation type on said evaluation value with respect to said local state;
   inserting the generic meta data component back into the broadcast signal in response to a determination in the repeated evaluating step to not make the insertion, to obtain a reconstructed broadcast signal; and
   broadcasting the reconstructed broadcast signal to the viewers.

49. The method of controlling distribution of enhanced television content for viewers using said data modification device as set forth in claim 42 wherein the evaluation value of the substitution determination parameter comprises a unique identifier and said local state comprises a unique identifier for a machine implementing said method.

50. The method of controlling distribution of enhanced television content for viewers using said data modification device as set forth in claim 49 wherein the evaluation value and the local state are defined by options established by an Advanced Television Enhancement Forum specification.

* * * * *

UNITED STATES PATENT AND TRADEMARK OFFICE
CERTIFICATE OF CORRECTION

PATENT NO. : 7,757,265 B2  
APPLICATION NO. : 09/818052  
DATED : July 13, 2010  
INVENTOR(S) : Steven Reynolds et al.

It is certified that error appears in the above-identified patent and that said Letters Patent is hereby corrected as shown below:

In the Claims:

In column 9, line 25, in Claim 28, delete "priori" and insert -- priority --, therefor.

In column 9, line 25, in Claim 28, after "priori comparison," insert -- string comparison, --.

Signed and Sealed this

Twelfth Day of October, 2010

David J. Kappos  
*Director of the United States Patent and Trademark Office*